US011994160B2

(12) United States Patent
Berres

(10) Patent No.: US 11,994,160 B2
(45) Date of Patent: May 28, 2024

(54) FASTENER

(71) Applicant: Illinois Tool Works Inc., Glenview, IL (US)

(72) Inventor: Jeremy Berres, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/112,281

(22) Filed: Feb. 21, 2023

(65) Prior Publication Data

US 2023/0392628 A1    Dec. 7, 2023

Related U.S. Application Data

(60) Provisional application No. 63/427,130, filed on Nov. 22, 2022, provisional application No. 63/332,887, filed on Apr. 20, 2022.

(51) Int. Cl.
*F16B 5/06*    (2006.01)
*F16B 2/22*    (2006.01)

(52) U.S. Cl.
CPC ............... *F16B 5/065* (2013.01); *F16B 2/22* (2013.01); *Y10T 24/309* (2015.01)

(58) Field of Classification Search
CPC ........ Y10T 24/309; F16B 21/075; F16B 2/22; F16B 5/065
See application file for complete search history.

(56) References Cited

U.S. PATENT DOCUMENTS 4,122,583 A   10/1978  Grittner
4,610,588 A    9/1986  Buren, Jr.
(Continued)

FOREIGN PATENT DOCUMENTS

DE    202007002704    7/2008
DE    102012001195    7/2013
(Continued)

OTHER PUBLICATIONS

PCT, International Search Report and Written Opinion regarding PCT Application No. PCT/US2023/063011, dated May 22, 2023, 12 pages.
(Continued)

*Primary Examiner* — Robert Sandy
*Assistant Examiner* — Michael S Lee
(74) *Attorney, Agent, or Firm* — McAndrews, Held & Malloy, Ltd.

(57) ABSTRACT

Disclosed is a fastener for coupling a first component to a second component. The fastener comprising a body portion, a bridge, and a shank portion. The body portion comprising a plurality of ribs arranged to form a U-bend. Each of the plurality of ribs defines a profile designed to regulate at least an insertion force of the fastener. The profile can be curved. The bridge connecting the plurality of ribs to each other at the U-bend. The shank portion extends from the body portion and includes a plurality of arms. Each arm is cantilevered at a free end of a rib from among the plurality of ribs and extends therefrom in a direction away from the body portion to be hingeable about the arm. The rib profile can be curved between the U-bend and shank portion.

19 Claims, 12 Drawing Sheets

(56) References Cited

U.S. PATENT DOCUMENTS

| | | | |
|---|---|---|---|
| 4,717,301 | A | 1/1988 | Oddenino |
| 4,920,618 | A | 5/1990 | Iguchi |
| 4,960,354 | A | 10/1990 | Moore |
| 5,051,021 | A | 9/1991 | Pelz |
| 5,195,793 | A | 3/1993 | Maki |
| 5,301,396 | A | 4/1994 | Benoit |
| 5,509,182 | A | 4/1996 | Nakanishi |
| 5,671,513 | A | 9/1997 | Kawahara |
| D405,828 | S | 2/1999 | Richter |
| 6,047,675 | A | 4/2000 | Kunz |
| 6,074,150 | A | 6/2000 | Shinozaki |
| 6,231,109 | B1 | 5/2001 | Beaver |
| 6,253,423 | B1 | 7/2001 | Friedrich |
| 6,449,814 | B1 | 9/2002 | Dinsmore |
| 6,481,682 | B2 | 11/2002 | Miura |
| 6,712,329 | B2 | 3/2004 | Ishigami |
| 6,715,185 | B2 | 4/2004 | Angellotti |
| 6,796,006 | B2 | 9/2004 | Hansen |
| 6,854,946 | B2 | 2/2005 | Bauer |
| D510,257 | S | 10/2005 | Marty |
| 7,114,221 | B2 | 10/2006 | Gibbons |
| 7,152,281 | B2 | 12/2006 | Scroggie |
| 7,178,855 | B2 | 2/2007 | Catron |
| 7,231,696 | B2 | 6/2007 | Asano |
| 7,300,089 | B2 | 11/2007 | Kuroda |
| 7,401,388 | B2 | 7/2008 | Hansen |
| 7,413,371 | B2 | 8/2008 | Arnold |
| 7,444,721 | B2 | 11/2008 | Smith |
| 7,536,755 | B2 | 5/2009 | Nakajima |
| 7,552,516 | B2 | 6/2009 | Okada et al. |
| D625,580 | S | 10/2010 | Giordano |
| 7,900,953 | B2 | 3/2011 | Slobodecki |
| 7,954,205 | B2 | 6/2011 | Xueyong |
| 8,046,880 | B2 | 11/2011 | Katoh |
| 8,056,193 | B2 | 11/2011 | Park |
| 8,322,001 | B2 | 12/2012 | Ehrhardt |
| 8,511,631 | B2 | 8/2013 | Kato |
| 8,528,295 | B2 | 9/2013 | Glynn |
| 8,585,121 | B2 | 11/2013 | Marx |
| 8,613,128 | B2 | 12/2013 | Moerke |
| 8,671,528 | B2 | 3/2014 | Hayashi |
| 8,683,662 | B2 | 4/2014 | Cooley |
| 8,834,087 | B2 | 9/2014 | Kirchen |
| 8,865,290 | B2 | 10/2014 | Gosis et al. |
| 8,875,357 | B2 | 11/2014 | Réznar |
| 8,979,156 | B2 | 3/2015 | Mally |
| 9,079,341 | B2 | 7/2015 | Risdale |
| 9,303,665 | B2 | 4/2016 | Steltz |
| D759,475 | S | 6/2016 | Banno |
| D759,476 | S | 6/2016 | Iwahara |
| D767,372 | S | 9/2016 | Itou |
| 9,982,694 | B2 | 5/2018 | Scroggie |
| 10,125,804 | B2 | 11/2018 | Krippl |
| D845,120 | S | 4/2019 | Kosidlo |
| 10,471,909 | B2 | 11/2019 | Abe |
| D876,207 | S | 2/2020 | Elliott |
| D934,063 | S | 10/2021 | Buczynski |
| D936,458 | S | 11/2021 | Wu |
| 2003/0200634 | A1 | 10/2003 | Hansen |
| 2004/0016088 | A1 | 1/2004 | Angellotti |
| 2005/0155191 | A1* | 7/2005 | Asano ............... F16B 5/0664 24/297 |
| 2007/0107174 | A1 | 5/2007 | Bordas |
| 2008/0052878 | A1 | 3/2008 | Lewis |
| 2009/0188086 | A1 | 7/2009 | Okada |
| 2010/0146747 | A1 | 6/2010 | Reznar |
| 2012/0073089 | A1 | 3/2012 | Buillas |
| 2015/0113773 | A1 | 4/2015 | Iwahara |
| 2015/0128386 | A1 | 5/2015 | Lepper |
| 2015/0322985 | A1 | 11/2015 | Scroggie |
| 2015/0337882 | A1 | 11/2015 | Iwahara |
| 2016/0129854 | A1 | 5/2016 | Bachelder |
| 2016/0290380 | A1 | 10/2016 | Fellows |
| 2016/0368433 | A1 | 12/2016 | Vega Velazquez |
| 2017/0051780 | A1 | 2/2017 | Dickinson |
| 2017/0129421 | A1 | 5/2017 | Dickinson |
| 2017/0268550 | A1 | 9/2017 | Michelini |
| 2018/0128297 | A1 | 5/2018 | Meyers |
| 2019/0048911 | A1 | 2/2019 | Bidlake |
| 2019/0323530 | A1* | 10/2019 | Lee ............... F16B 21/075 |
| 2020/0232495 | A1 | 7/2020 | Lepper |
| 2020/0339044 | A1* | 10/2020 | Dickinson ........... F16B 5/065 |
| 2021/0221492 | A1 | 7/2021 | Vincon |
| 2021/0276497 | A1 | 9/2021 | Buczynski |
| 2023/0184280 | A1* | 6/2023 | Ozaki ............... F16B 19/10 411/115 |

FOREIGN PATENT DOCUMENTS

| | | |
|---|---|---|
| EP | 1363069 | 11/2003 |
| EP | 3557086 | 10/2019 |
| GB | 2167515 | 5/1986 |
| WO | 2015175098 | 11/2015 |
| WO | 2016073231 | 5/2016 |
| WO | 2016144438 | 9/2016 |
| WO | 2017164967 | 9/2017 |
| WO | 2018147984 | 8/2018 |
| WO | 2019040301 | 2/2019 |
| WO | 2021152468 | 8/2021 |

OTHER PUBLICATIONS

NPL Exam Report for German Patent Application No. 10 2021 101 760.2, dated Sep. 23, 2022 (4 pages).

Int'l Search Report and Written Opinion Appln No. PCT/IB2021/050611 mailed May 31, 2021.

* cited by examiner

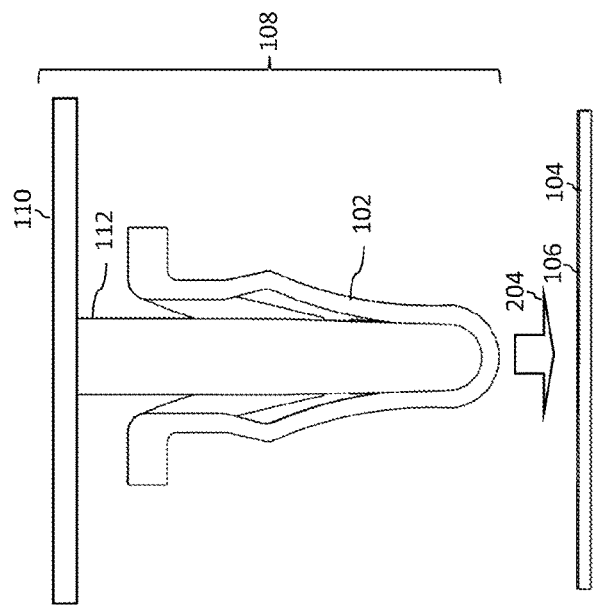
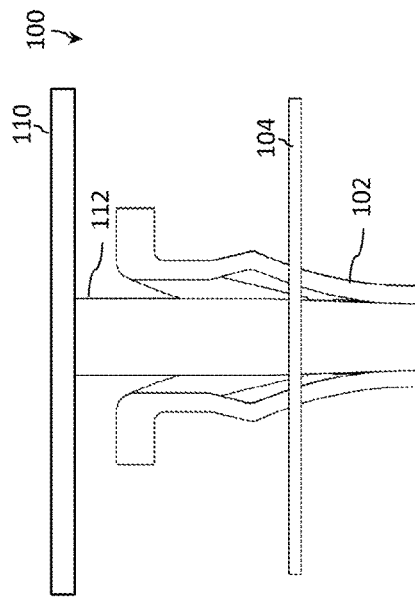
FIG. 2b
FIG. 2c
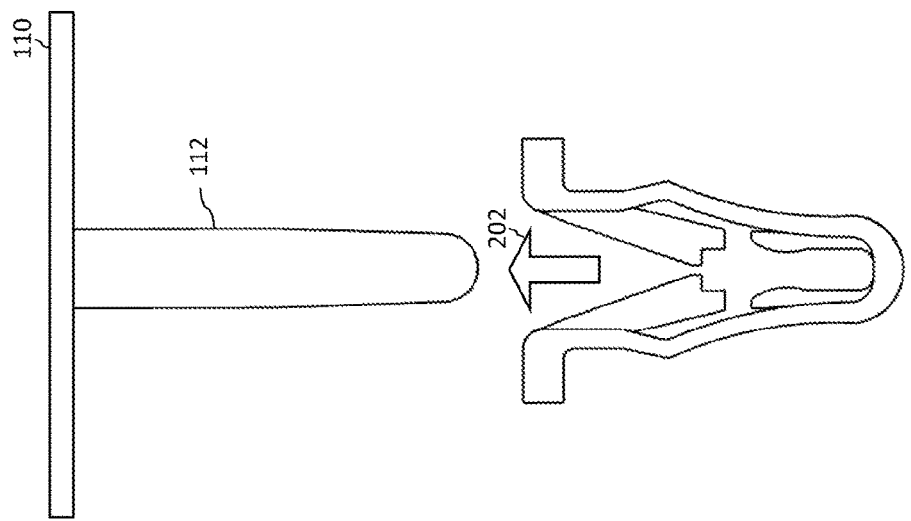
FIG. 2a

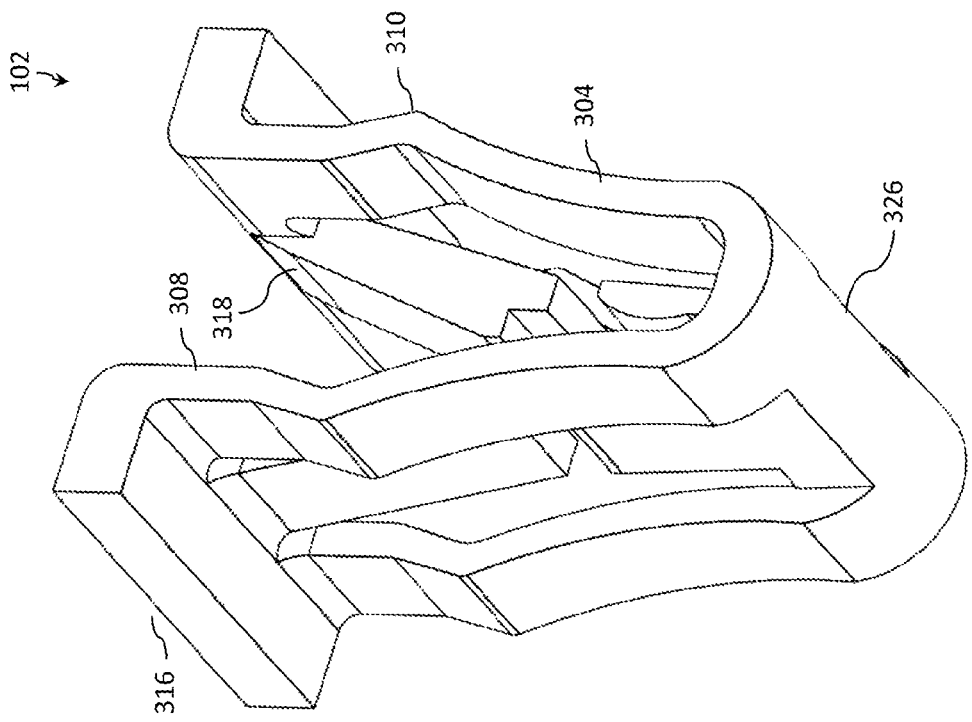
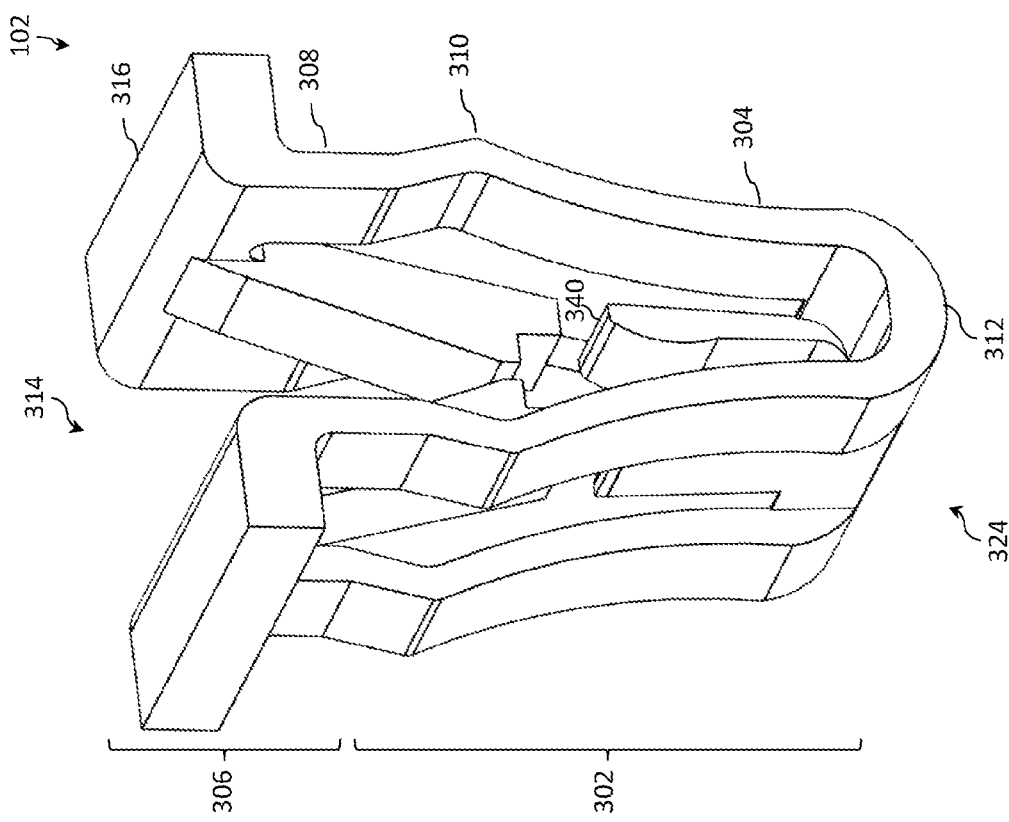
FIG. 3b
FIG. 3a

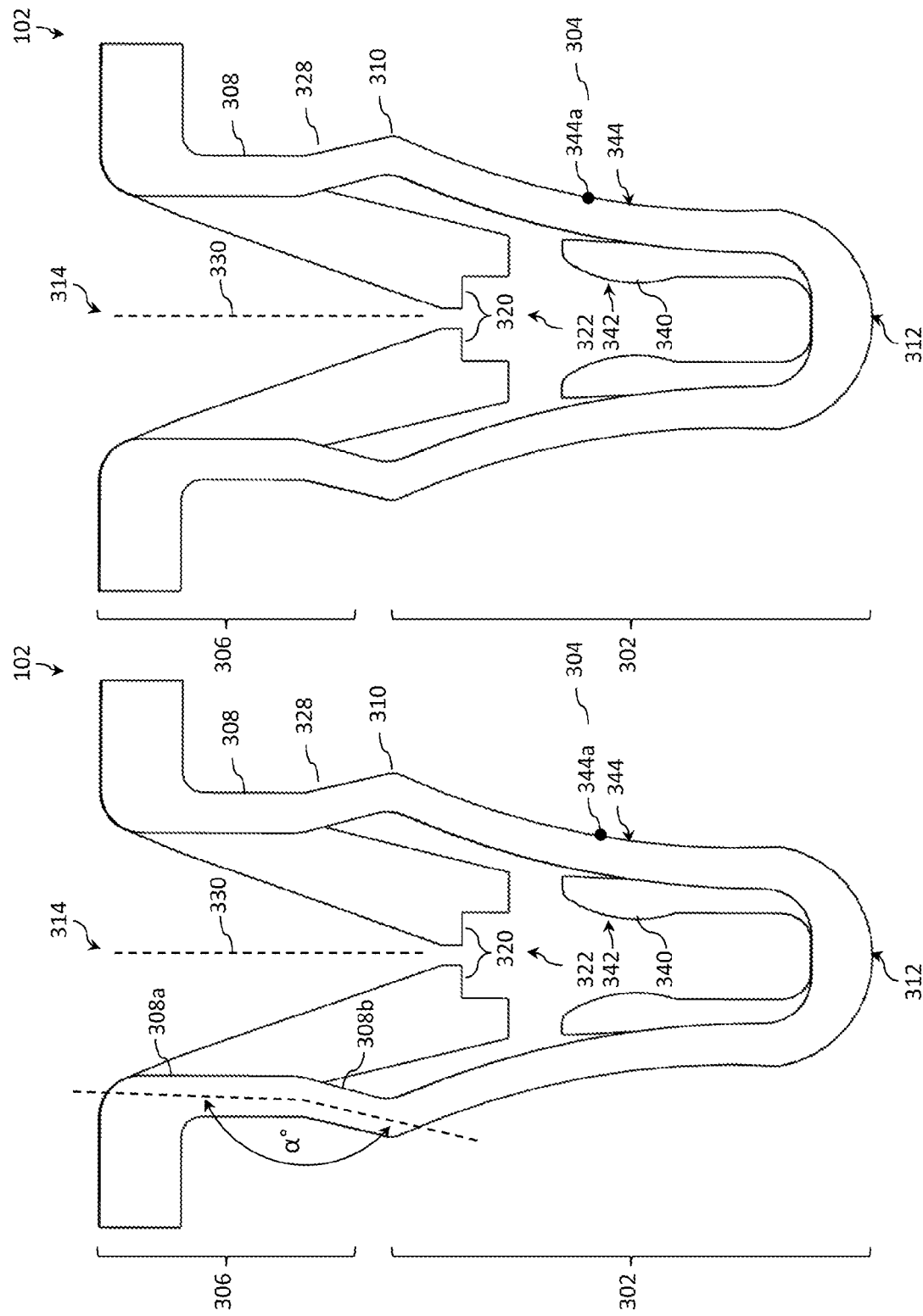

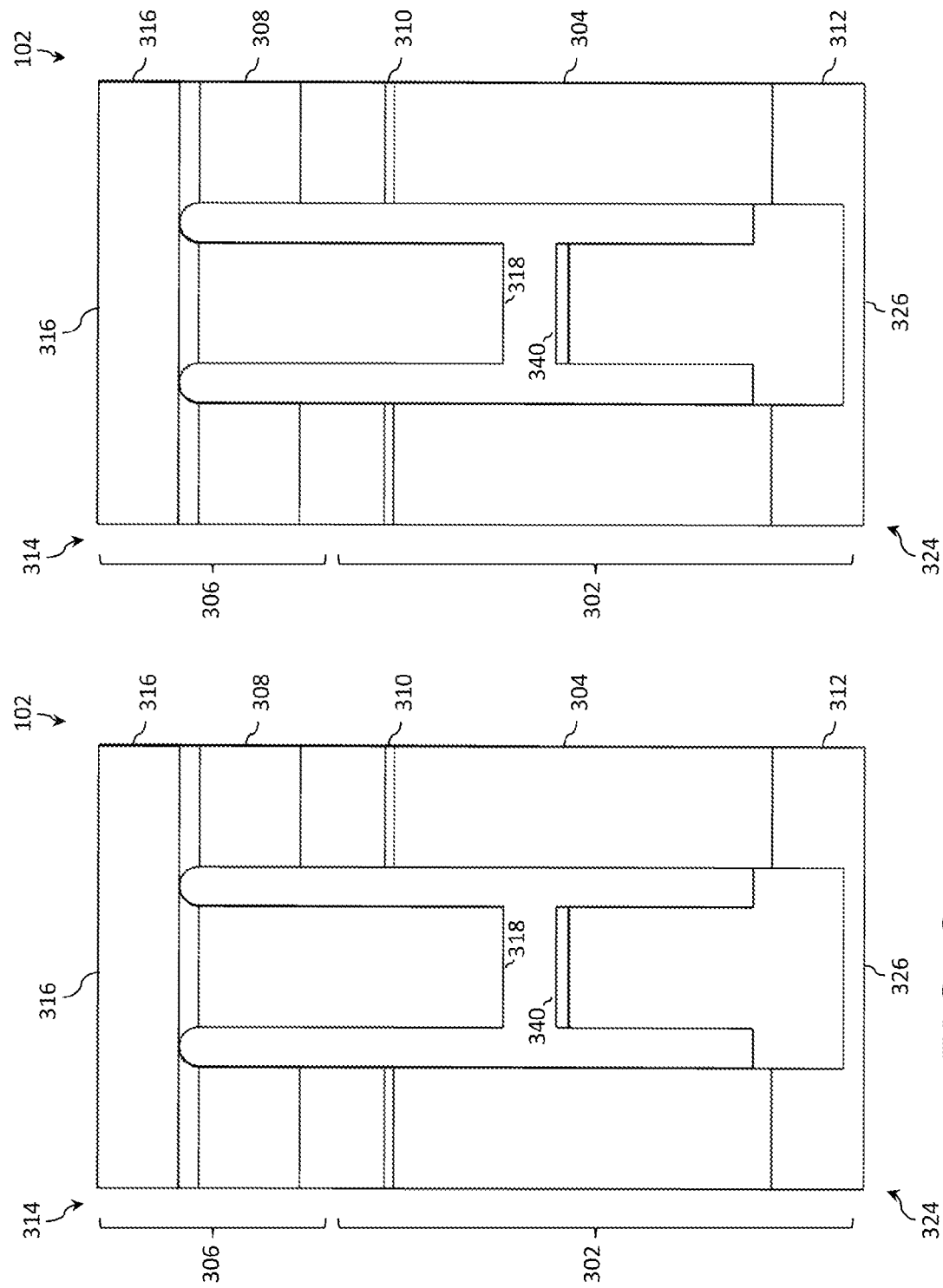

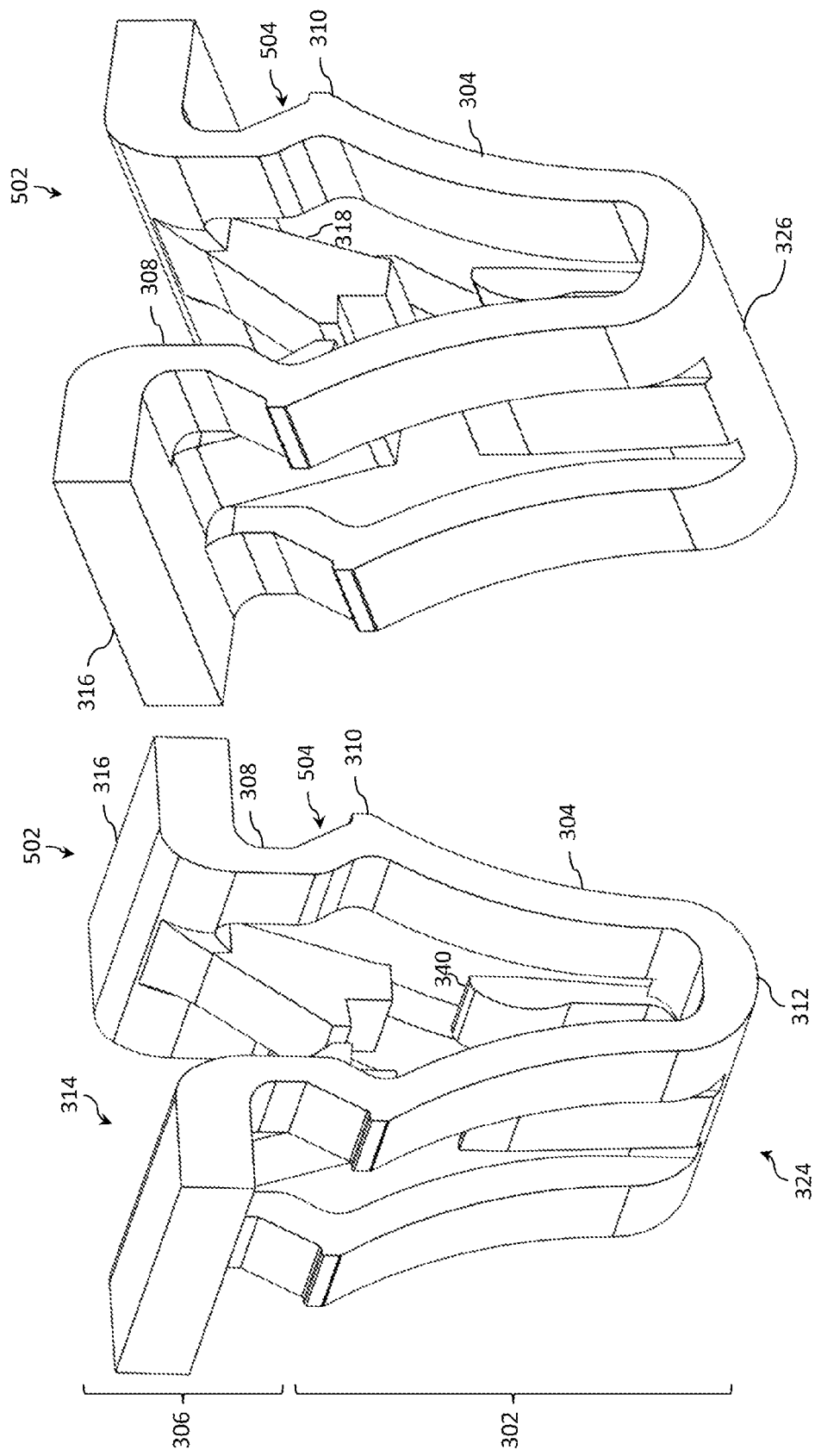

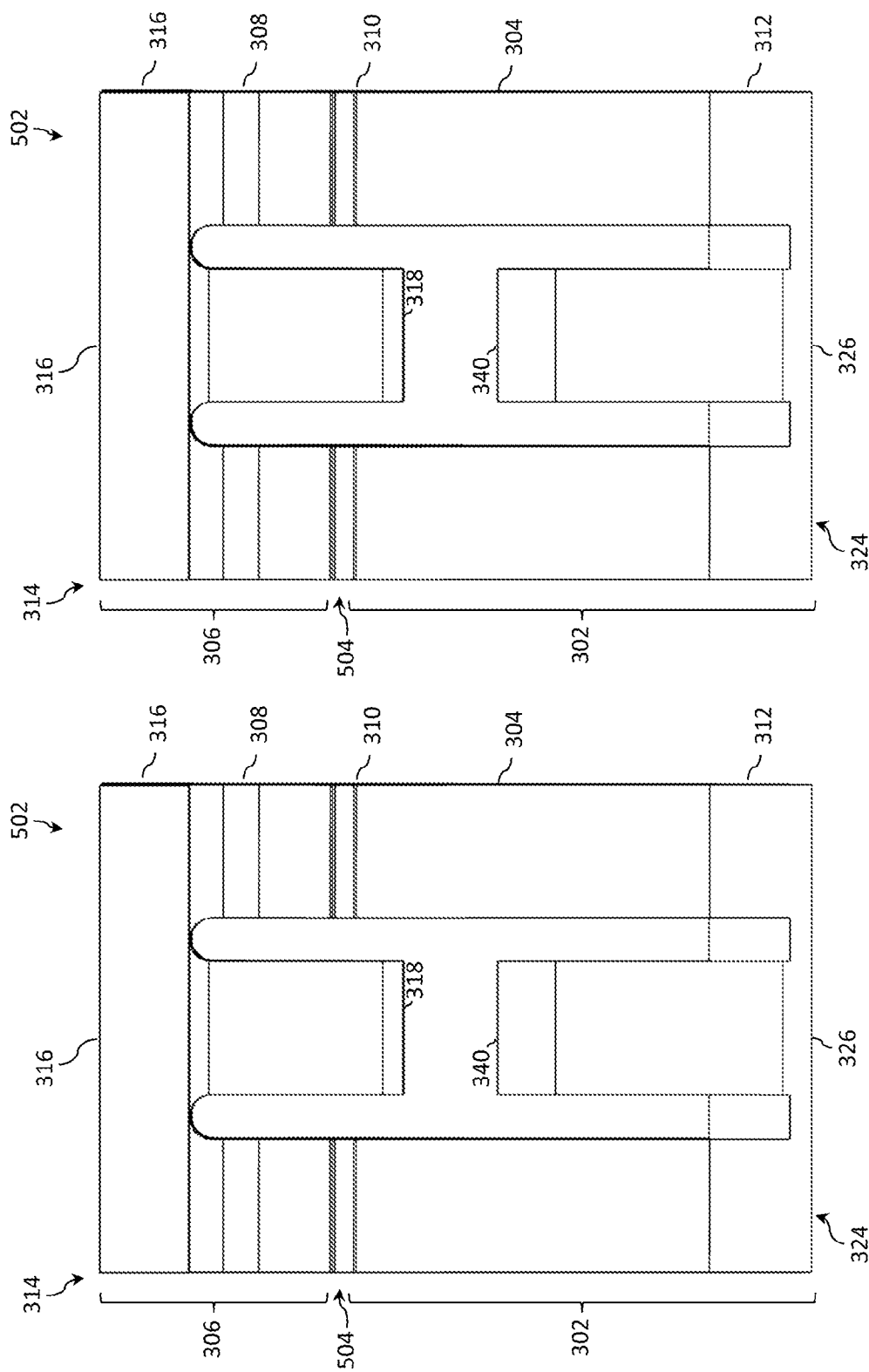

FASTENER

CROSS-REFERENCE

The present application claims priority to United States Provisional Patent Application Nos. 63/332,887, filed Apr. 20, 2022 and 63/427,130, filed Nov. 22, 2022, each of which is entitled "Fastener" and hereby incorporated by reference in its entirety.

BACKGROUND

Automotive components require fastening techniques that are simple to manufacture and assemble. Further, fastening techniques should above all be reliable and efficient. In order to secure a secondary panel to a primary panel, a fastener may be used, such as a pin and grommet fastener.

Various types of fasteners are used for fastening components. For example, in case of an instrument panel of a vehicle, fasteners may be used to fix together adjacent panels or to secure one or more objects on the panels. One such type of fasteners is usable with holes of different types, sizes, and shapes provided in the components to be secured together. In other words, for such a fastener to fasten the components, at least one of the components is provided with a hole. One of the components is mounted on the fastener and other component having the hole receives the fastener component assembly.

Traditionally, metal fasteners are used with metal components and panels because the metal components and panels can damage plastic fasteners. However, plastic fasteners offer advantages; for example, in terms of cost and ease of manufacture. Therefore, despite various advancements to date, it would nevertheless be desirable to provide a plastic fastener that can be used with metal panels.

SUMMARY

The present disclosure relates generally to a fastening system to form a blind connection between the panels, such as automotive panels, substantially as illustrated by and described in connection with at least one of the figures, as set forth more completely in the claims. In some examples, the fastening system uses a plastic fastener that can be used with metal panels.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIGS. 2a through 2c illustrate side views of the fastening system in different stages of assembly.

FIGS. 3a and 3b illustrate, respectively, topside and understate isometric views of the fastener.

FIGS. 3c and 3d illustrate front and rear elevation views of the fastener.

FIGS. 3e and 3f illustrate first and second side elevation views of the fastener.

FIGS. 5a and 5b illustrate, respectively, topside and understate isometric views of a fastener in accordance with another aspect of this disclosure.

FIGS. 5e and 5f illustrate first and second side elevation views of the fastener.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Figure 1A:
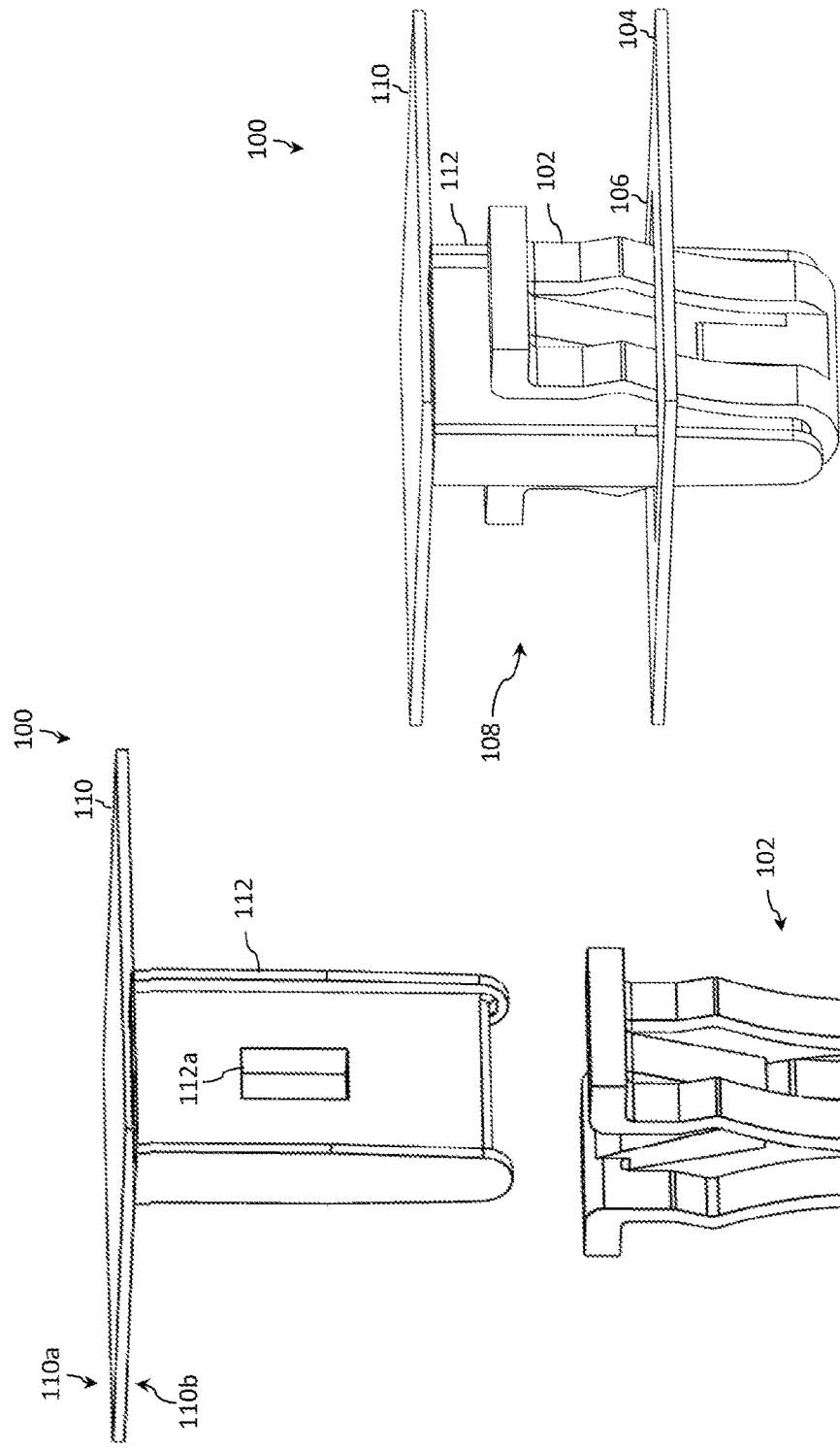
FIGS. 1a and 1b illustrate, respectively, assembly and assembled isometric views of a fastening system in accordance with aspects of this disclosure.
Figure 1B:
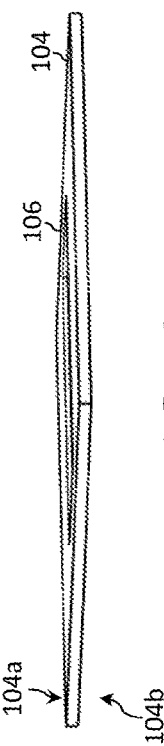
Figure 1C:
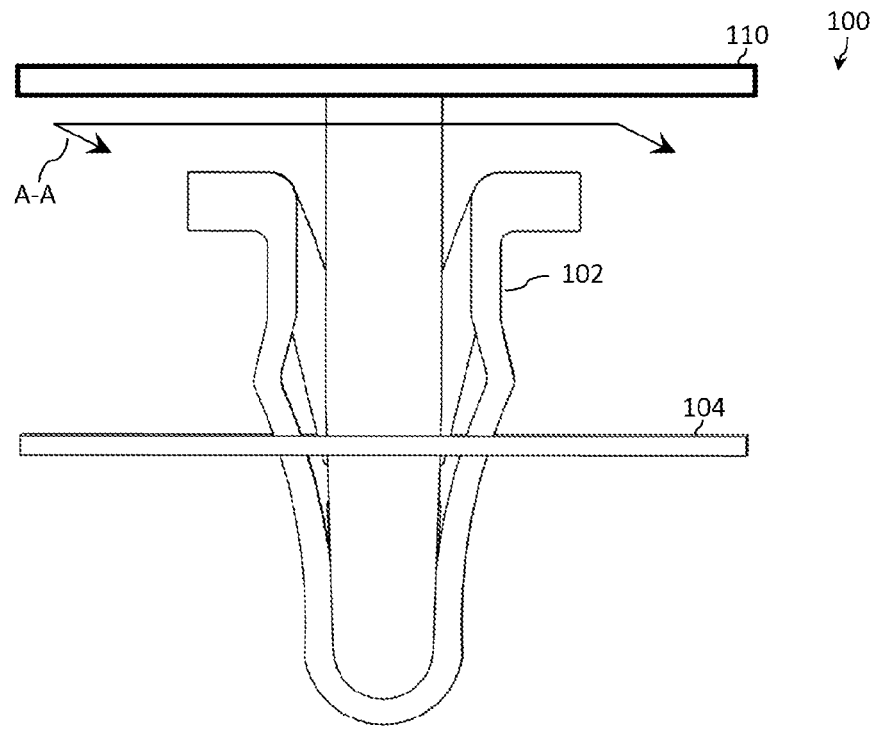
FIGS. 1c and 1d illustrate, respectively, side and cross-sectional views of the assembled fastening system.
Figure 1D:
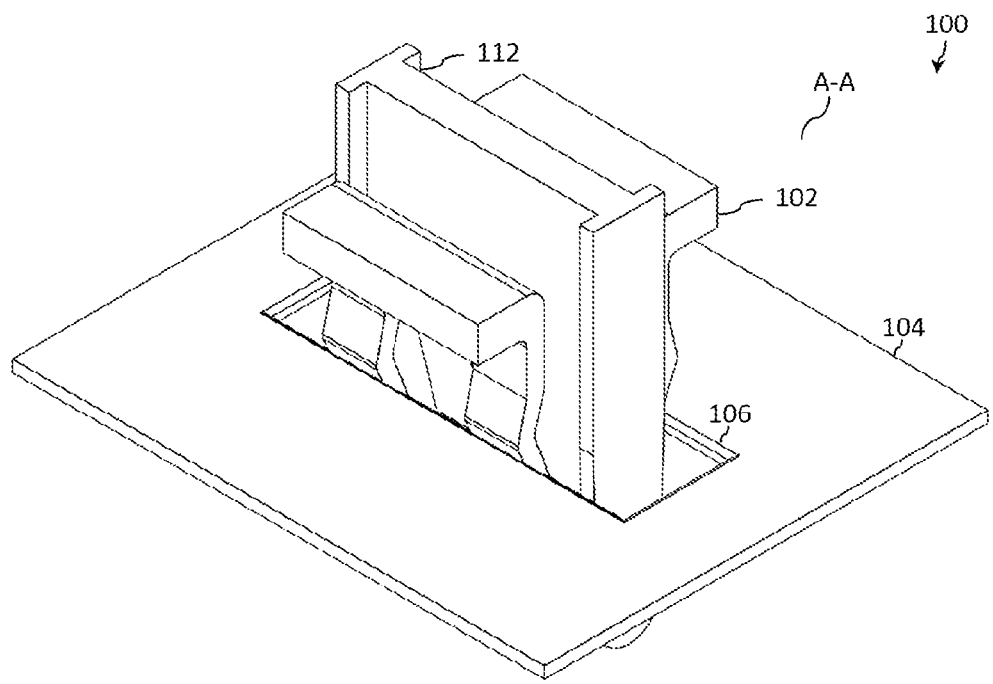

FIGS. 1a through 1d illustrate views of an example fastening system 100. Specifically, FIGS. 1a and 1b illustrate, respectively, assembly and assembled isometric views of the fastening system 100, while FIGS. 1c and 1d illustrate, respectively, side and cross-sectional views of the assembled fastening system 100. The cross-sectional view of FIG. 1d is taken along the cutline A-A of FIG. 1c. As illustrated, the fastening system 100 generally includes a fastener 102 configured to join a first component 104 and a second component 110 via a clip tower 112 associated with the second component 110. The first component 104 and the second component 110 may be, for example, automotive panels.

Depending on the application, the first component 104, the second component 110, and/or the clip tower 112 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In the automotive industry, example panels include, without limitation, door trim panels, moldings, trim pieces, hoods, doors, pillars (e.g., an A-pillar, B-pillar, C-pillar, etc.), dashboard components (e.g., a cross member, bracket, frame, etc.), seat frames, center consoles, fenders, sheet metal framework, and/or other substrates (whether used as interior or exterior surfaces).

The first component 104 includes one or more openings 106, while the second component 110 includes one or more clip towers 112. Each of the one or more openings 106 is configured to receive or otherwise engage the fastener 102 (and associated clip tower 112), while the one or more clip towers 112 are configured to engage the one or more fasteners 102. In some examples, the first component 104 defines an A-surface 104a and a B-surface 104b (illustrated as an undersurface). Similarly, the second component 110 also defines an A-surface 110a and a B-surface 110b (illustrated as an undersurface). The A-surface 104a of the first component 104 generally refers to the outward facing surface, while the B-surface 104b of the first component 104 generally refers to the inward facing surface. When assembled, the A-surface 104a of the first component 104 generally faces the B-surface 110b of the second component 110.

The A-surface 110a, also called a class A surface, is typically the surface that is visible after assembly and, for that reason, is more aesthetically pleasing (e.g., textured, coated, or otherwise decorated) and typically free of attachment devices and/or related features. Conversely, the B-surface 110b, also called a class B surface, is typically the surface that is not visible after assembly and typically includes various attachment devices and/or related features. In an example, the first component 104 and the second component 110 can be parts of an instrument panel of a vehicle. For instance, the second component 110 can be a dashboard and the first component 104 can be an instrument cluster to be mounted to the dashboard (or vice versa).

The second component 110 may include, define, or otherwise be associated with attachment devices and/or related features, such as the one or more clip towers 112. For example, the second component 110 may include one or more clip towers 112 that protrude from the B-surface 110b. As illustrated, each of the one or more clip towers 112 is generally perpendicular to the second component 110. In some examples, the clip tower 112 can have a seating portion 112a, for instance, formed as a slot. The clip towers 112 may be integral with second component 110 (e.g., co-molded) or attached separately (e.g., using adhesive or otherwise).

The fastener 102 can be slipped over and secured to the clip tower 112 of the second component 110 to define a part-in-assembly (PIA) component 108. The PIA component 108 may then be later attached to the first component 104 by an end-user (e.g., a customer). Thus, in some examples, the PIA component 108 may be pre-assembled at the factory and shipped to an end-user for final assembly with the first component 104.

The fastener 102 may be fabricated from, for example, a synthetic polymer or a semi-synthetic polymer. In some examples, the fastener 102 may be a printed thermoplastic material component that can be printed with great accuracy and with numerous details, which is particularly advantageous, for example, in creating components requiring complex and/or precise features. In addition, additive manufacturing techniques obviate the need for mold tooling typically associated with plastic injection molding, thereby lowering up-front manufacturing costs, which is particularly advantageous in low-volume productions. In some examples, the fastener 102 may be fabricated with the first component 102 using material extrusion (e.g., fused deposition modeling (FDM)), stereolithography (SLA), selective laser sintering (SLS), material jetting, binder jetting, powder bed fusion, directed energy deposition, VAT photopolymerisation, and/or any other suitable type of additive manufacturing/3D printing process.

FIGS. 2a through 2c illustrate side views of an example fastening system 100 in different stages of assembly. Specifically, FIG. 2a illustrates a second component 110 with a fastener 102 being slipped onto the clip tower 112 of the second component 110 as indicated by arrow 202 to define the PIA component 108, while FIG. 2b illustrates the fastener 102 and clip tower 112 of the assembled PIA component 108 being at least partially inserted in the opening 106 of the first component 104 as indicated by arrow 204. FIG. 2c illustrates the PIA component 108 fully assembled with the first component 104.

Figure 3H:
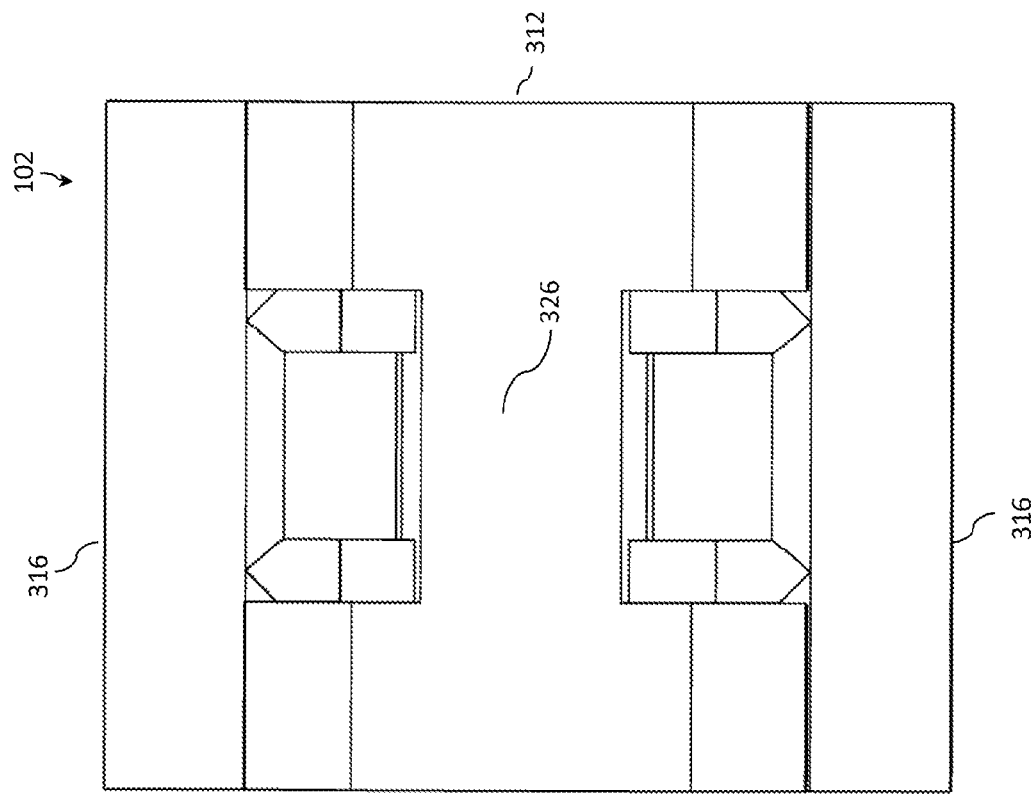
FIGS. 3g and 3h illustrate, respectively, topside and underside plan views of the fastener.
Figure 3G:
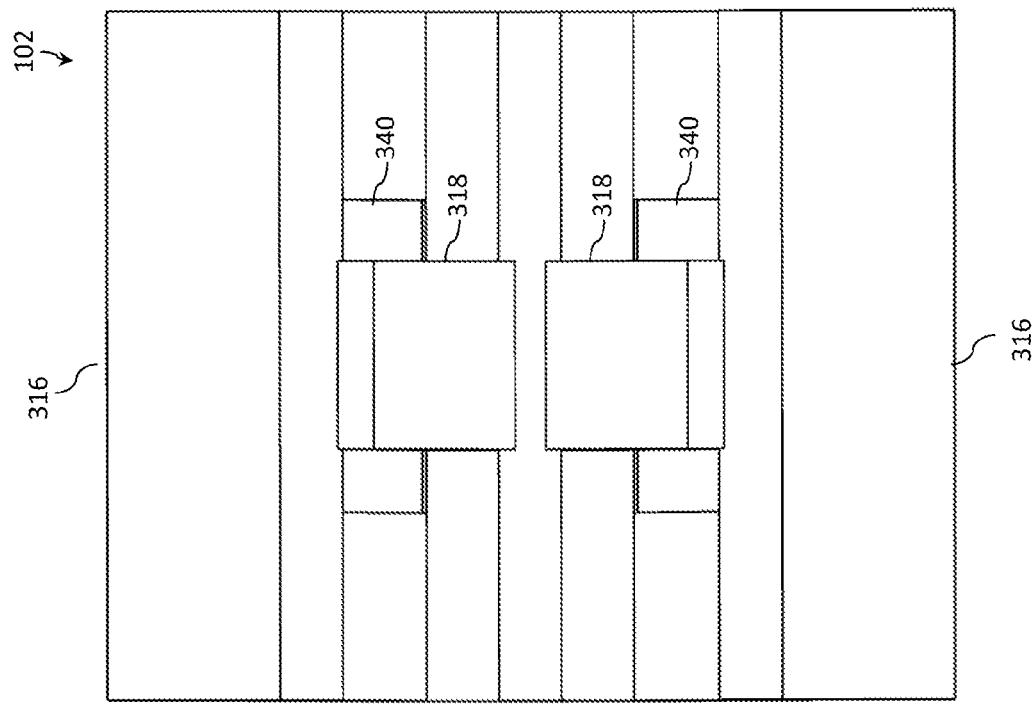

FIGS. 3a and 3b illustrate, respectively, topside and understate isometric views of the fastener 102, while FIGS. 3c and 3d illustrate front and rear elevation views of the fastener 102. FIGS. 3e and 3f illustrate first and second side elevation views of the fastener 102, while FIGS. 3g and 3h illustrate, respectively, topside and underside plan views of the fastener 102. For the sake of brevity and ease of understanding, FIGS. 3a through 3h are described in conjunction with each other.

An illustrated in connect with FIGS. 1a through 1d and FIGS. 2a through 2c, the fastener 102 can be used to form a connection between a first component 104 and a second component 110, such as automotive panels. The fastener 102 may be fabricated from a generally rigid material, such as a plastic material. For instance, the plastic material may include polypropylene (PP), acrylonitrile butadiene styrene (ABS), polycarbonate (PC), polymethylmethacrylate (PMMA), polyoxymethylene (POM), or a combination thereof. As will become apparent, the subject fastener 102 can be fabricated from a plastic material while remaining suitable for use with metal components. Therefore, in one example, the fastener 102 is fabricated from a plastic material, while the first component 104 and/or the second component 110 are metal.

In some examples, the fastener 102 is designed in such a manner that the fastener 102 is ergonomic in terms of being inserted into the opening 106 in the first component 104, whereas at the time of separation or withdrawal of the fastener 102 from the opening 106, the fastener 102 may require a considerably large amount of force in comparison to that for insertion. In other words, the fastener 102 is designed to have a low insertion force but to have a relatively high separation force. At the same time, the insertion force and the separation force for which the fastener 102 is designed may have no bearing on each other.

The fastener 102 can include a body portion 302 formed by a plurality of ribs 304 running parallel to each other forming U-shape. The fastener 102 may further include a shank portion 306 extending from the body portion 302. The shank portion 306 can have a plurality of arms 308, with each arm 308 coupled to a free end of a rib 304 and extending therefrom in a direction away from the body portion 302. Each arm 308 may be cantilevered at the free end of the rib 304 to which that arm 308 is attached. Accordingly, the arm 308 may be hingeable about a point of connection 310 to the rib 304. In other words, the arm 308 may be hingeable about a junction between the arm 308 and the rib 304.

The free ends of the plurality of arms 308 can form a first end 314 of the fastener 102, whereas an end of the fastener 102 at a U-bend 312 of the plurality of ribs 304 can form a second end 324 of the fastener 102 opposite to the first end 314. The second end 324 of the fastener 102 can be formed as being tapered for inserting the fastener 102 into the opening 106 in the first component 104 to which the fastener 102 is to be fitted into.

At the first end 314 of the fastener 102, the ends of the plurality of arms 308 on one side of the U-bend 312 can be connected to each other as well as the ends of the plurality of arms 308 on the other side of the U-bend 312 can be connected to each other. In other words, on either side of the U-bend 312, the ends of the arms can be connected to each other by a connecting element 316. The fastener 102, therefore, may include two connecting elements 316 at the first end 314 of the fastener, on either side of the U-bend 312. The connecting elements 316 on either side can extend in a direction on each side of the plane 330 to form an arrester feature which prevents the first component 104 from disengaging from the fastener 102.

In addition, the fastener 102 can have a plurality of mounting brackets 318 to mount the fastener 102 to the second component 110. In an example, at least one mounting bracket 318 can be provided on either side of the axis 330. As illustrated, the mounting brackets 318 are supported at the connecting element 316 at the first end 314. In said example, to accommodate a portion of the second component 110, each mounting bracket 318 can have a seat 320. Further, the seats 320 of the two mounting brackets 318 on either side of the U-bend 312 may form a bucket-shaped cavity 322 (or other recess) for receiving the portion of the second component 110 to be mounted onto the fastener 102. For instance, the second component 110 may include the clip tower 112 formed as a protrusion, which can cooperate with the bucket-shaped cavity 322 of the mounting brackets 318 to mount the second component 110 at the fastener 102. In an example, the clip tower 112 can have a seating portion 112a. The seating portion 112a is illustrated as a slot (e.g., a cutout or other opening) in the clip tower 112. When assembled, the bucket-shaped cavity 322 of the fastener 102 engages the seating portion 112a.

The second component 110 having the fastener 102 mounted thereon (e.g., via the clip tower 112) can then be inserted into the opening 106 in the first component 104, thereby fixing the first component 104 and the second component 110 together. For example, the fastener 102 can be inserted into the opening 106 of the first component 104 in a direction of the second end 324 being inserted first (as indicated in FIG. 2b by arrow 204). The above-described seats 320 and seating portion 112a serve to mitigate risk of the fastener 102 becoming disengaged from the clip tower 112 during subsequent disassembly of the first component 104 relative to the second component 110. In other words, the fastening system 100 can be disassembled such that the first component 104 and the fastener 102 disengage, while the fastener 102 remains attached to the clip tower 112 of the second component 110.

At the second end 324 of the fastener 102, i.e., at the U-bend 312, the plurality of ribs 304 can be joined by a bridge 326. According to an aspect, the bridge 326 can be designed in a way that it imparts flexural ability to the ribs 304 for being inserted into the opening 106, since the opening 106 may be sized larger than a span of the ribs 304 on either side of the U-bend 312.

According to an additional aspect, the ribs 304 can be designed to have a tapered shape along their length to further enhance their flexural ability without compromising their strength. In other words, the ribs 304 may be yieldable or flexible enough to bend and enter the opening 106 but after entering may regain almost their original span, without undergoing failure in the process. As will be explained later in detail, the flexural ability of the ribs 304, as per the design of the bridge 326, determines a force that is to be applied for inserting the fastener 102 into the opening 106.

In addition, to maintain the fastener 102 in the opening 106, as mentioned previously, the arms 308 may be hingeable about the point of connection 310 to the respective rib 304 that they are connected to. Similar to the bridge 326, the point of connection 310 between the rib 304 and the arm 308 for each of the set of ribs 304 and arms 308 connected to each other can be designed to provide a flexural ability to the arms 308 with respect to the ribs 304 as well as for provisioning the hold of the fastener 102 in the opening 106. In an example, when the fastener 102 is inserted into the opening 106, the fastener 102 may sit with the arms 308 abutting the opening 106. Accordingly, the arms 308 are designed to exert a considerably biased force on edges of the opening 106 so as to securely hold the fastener 102 in the opening 106. In addition, the point of connection 310 may have a profile 328 that supplements the arms 308 in securely holding the fastener 102 and preventing the withdrawal of the fastener 102 from the opening 106 unless a considerable amount of force is applied for removal. In an example, the profile 328 is generally linear and extends in a laterally outward direction with respect to a plane 330 passing through the fastener 102 cutting through the U-bend 312 across the ribs 304. The profile 328 can, thereby, form a locking area at which the fastener 102 locks when positioned into the opening 106 and is prevented from being detached, thereby preventing the first component 104 from being dislodged relative to the second component 110.

Furthermore, the fastener 102 may include at least one grasping element 340 on either side of the U-bend 312, the grasping elements 340 being coupled to the bridge 326 and extending from the bridge towards the first end 314 of the fastener 102. In other words, the grasping elements 340 can extend along the body portion 302, i.e., in the direction in which the body portion 302 of the fastener 102 extends. The grasping elements 340 grip or otherwise engage the clip tower 112 that is mounted onto the fastener 102.

According to an aspect, the grasping element 340 can have a mating face 342 which can come in contact directly with a surface of the clip tower 112. The mating face 342 can be shaped to taper in the direction from the first end 314 to the second end 324. In other words, the mating face 342 can be shaped to taper in the direction from the U-bend 312 along the body portion 302, i.e., along the direction that the body portion 302 of the fastener 102 extends. Therefore, during assembly, the mating face 342 of the grasping elements 340 engages the tip of the clip tower 112 and allows the clip tower 112 to center itself relative to the fastener 102, while the above-described seats 320 locks the fastener 102 to the clip tower 112 via the seating portion 112a.

The taper on the mating face 342 can also complement the tapered shape of the ribs 304 to align the second component 110, for instance, the clip tower 112 of the second component 110, towards the center of the U-bend 312 when the second component 110 is being mounted to the fastener 102. This ensures an effective mounting of the second component 110 to the fastener 102.

The design of the fastener 102 can be based on an insertion force to be applied for inserting the fastener 102 into the opening 106 and the separation force to be applied to remove the fastener 102 from the opening 106. According to an aspect, the fastener 102 can be designed in a way that the insertion force of the fastener has no bearing on the separation force of the fastener 102 and vice-versa. For instance, the fastener 102 may require a nominal insertion force to make it ergonomic for use by a user, and at the same time, the design can also be such that that fastener 102 requires a considerably high separation force in comparison to the insertion force.

In some examples, the size of the bridge 326 may be selected to be small, so that the flexibility of the ribs 304 at the U-bend 312 may be high, thereby requiring a low insertion force to be applied for inserting the fastener 102 into the second component 110. In addition, the size of the bridge 326 can be further determined factoring in that the fastener 102 does not undergo failure or breakage while inserting and withdrawing the fastener 102 from the second component 110, for example, when the insertion and withdrawing is performed for 5 cycles or more. Therefore, the size of the bridge 326 of the fastener 102 can be determined based on a trade-off between the insertion force and the failure of the fastener 102. Accordingly, the material of the fastener 102 can be an additional factor in determining the size of the bridge 326, with due consideration of the above discussed factors.

The insertion force can be further a factor in designing the ribs 304. For example, to enhance the flexural ability of the ribs 304 without compromising their strength, the ribs 304 can be designed to have a tapered shape along their length. The high flexural ability of the ribs 304 further facilitates in designing the fastener 102 to have a nominal insertion force, such that the ribs 304 may be yieldable or flexible enough to bend and enter the opening 106 ergonomically and after entering may almost regain their original shape, without undergoing failure in the process.

As best illustrated in FIGS. 3c and 3d, the rib profile 344 of rib 304 is designed as having a curvature starting at the U-bend 312 and ending at the point of connection 310 with the arm 308. The curvature of the rib profile 344 increases the flexural ability of the ribs 304 during insertion without reducing the separation force needed. In the illustrated examples, the rib profile 344 on each side of the U-bend 312 is curved inwardly (i.e., toward the plane 330).

The increased flexural ability afforded by the curvature of the rib profile 344 mitigates damage to the fastener 102 when the fastener 102 is a plastic material and the first component 104 is metallic. For example, during insertion of the fastener 102 into the opening 106, the inner walls of the opening 106 typically contact the ribs 304 and cause the ribs 304 to flex inwardly. Curving the ribs 304 inwardly reduces contact forces and stress imparted on the ribs 304 by the opening 106 during assembly. Further, when extracting the fastener 102 (and associated clip tower 112) from the opening 106 of the first component 102, the ribs 304 bend or flex inward (toward the plane 330) at or near a center point 344a of the rib profile 344 rather than at only the U-bend 312. Bending or flexing the ribs 304 inward at or near the center point 344a causes the profile 328 of the point of connection 310 to become generally parallel to the plane 330 (rather than the illustrated laterally outward direction), thus mitigating damage to the point of connection 310. As a result, a plastic fastener 102 can be used more reliably with a metallic first component 104 while mitigating damage to the plastic fastener 102, thereby allowing for reuse of the plastic fastener 102 with metal first components 104. As best illustrated in FIG. 3c, each of the arms 308 includes a first linear portion 308a arranged at angle α relative to a second linear portion 308b. In this example, the first linear portion 308a is parallel to the plane 330, while the angle α may be, for example, between about 160 and 175 degrees, or about 167 degrees.

In some examples, the fastener 102 can also have features that can be designed based on the separation force for the fastener 102, i.e., the force to be applied on the fastener 102 for withdrawing the fastener 102 from the first component 104. In an example, the separation force for the fastener 102 can be at least 130 Newtons (N), whereas the insertion force can be less than about 45 N. As will be understood, the above values of insertion and separation forces are provided as examples are not to be construed to be limiting. According, for instance, depending on the design and the application, the values of nominal insertion force and the high separation force can fall outside the abovementioned ranges.

Figure 4:
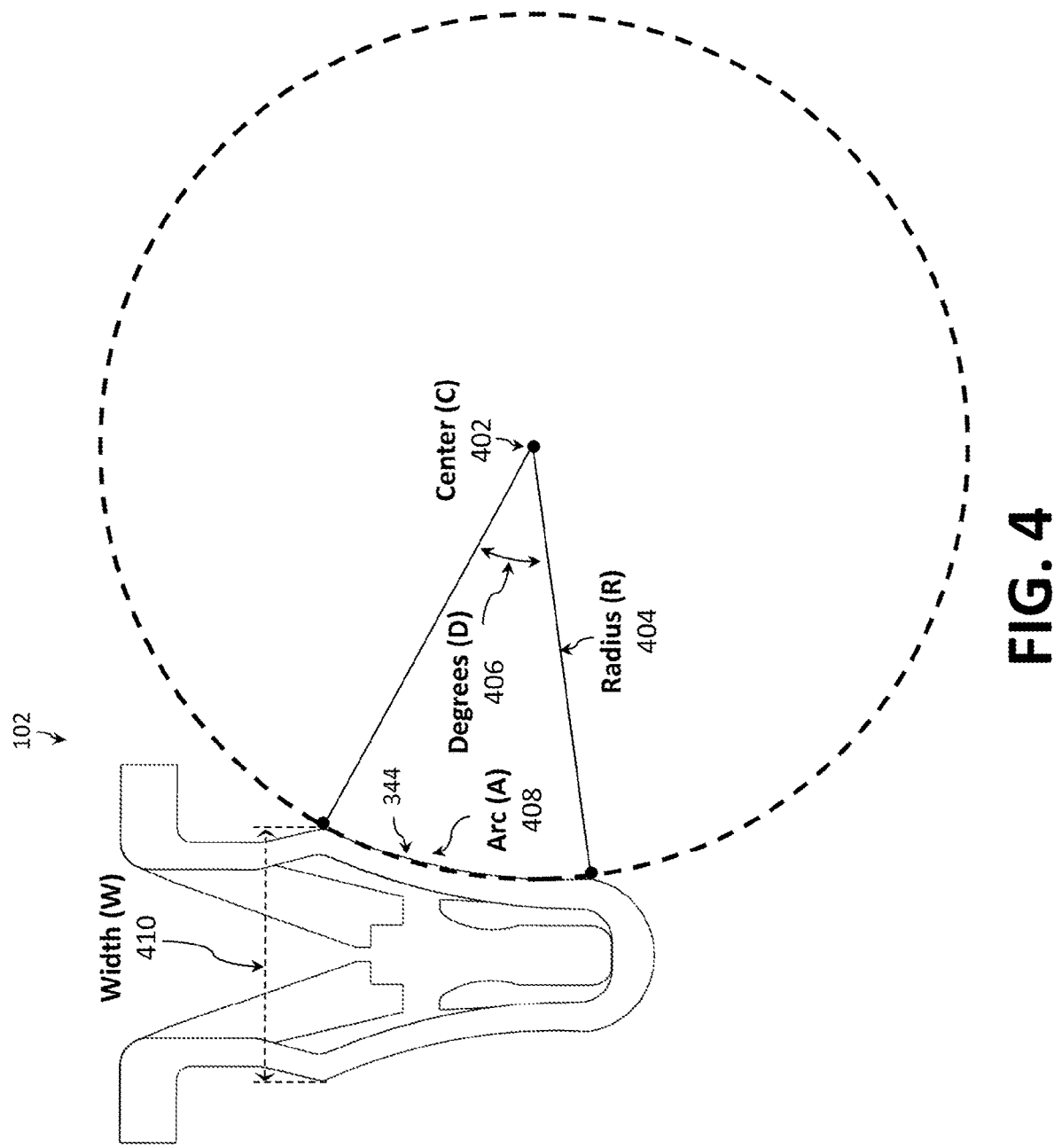
FIG. 4 illustrates a side view of a fastener with a rib profile designed with an inward curvature in accordance with an aspect of this disclosure.

FIG. 4 illustrates a side view of a fastener 102 having a rib profile 344 for the rib(s) 304 designed as having an inward curvature in accordance with an aspect of this disclosure. The curvature of the rib profile 344 can be described as a portion of circular arc (A) 408. The curvature and arc length of the rib profile 344 are a function of a radius of curvature (R) 404 (i.e., between the center (C) 402 and the portion of circular arc (A) 408) and degrees (D) 406. In some examples, the radius of curvature (R) 404 for the rib profile 344 is between 15 mm and 30 mm. One of ordinary skill in the art would appreciate from the subject disclosure that the portion of circular arc (A) 408 can be adjusted to accommodate differently sized and shaped openings 106. For example, where the opening 106 is wider, the degrees (D) 406 can be increased to correspondingly increase the length of the portion of circular arc (A) 408, which in turn results in a fastener 102 having an increased width (W) 410. Conversely, where a narrower opening 106 is used, the degrees (D) 406 can be decreased to yield a smaller width (W) 410.

Figure 5C:
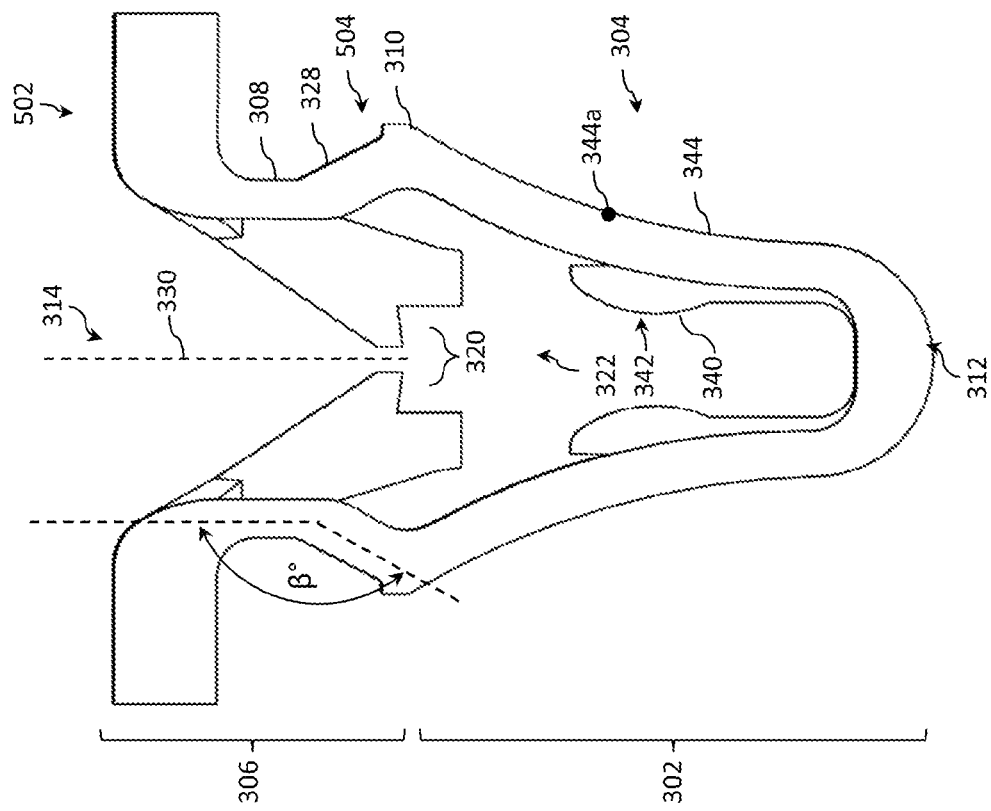
FIGS. 5c and 5d illustrate front and rear elevation views of the fastener.
Figure 5D:
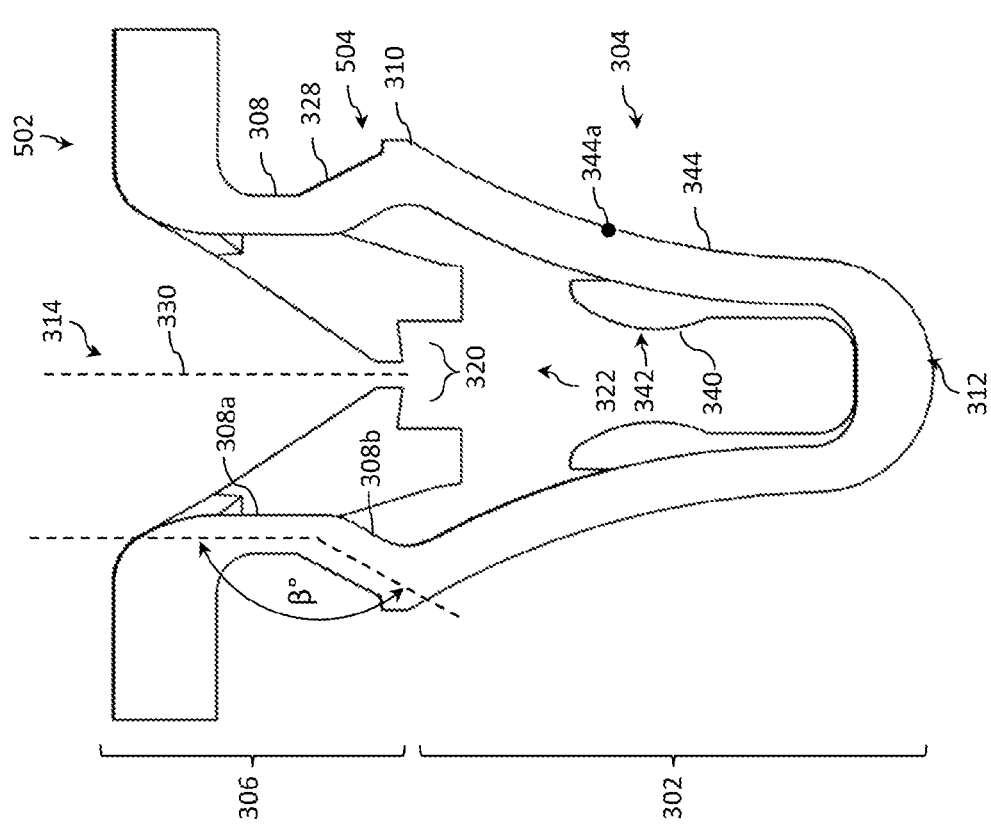
Figure 5H:
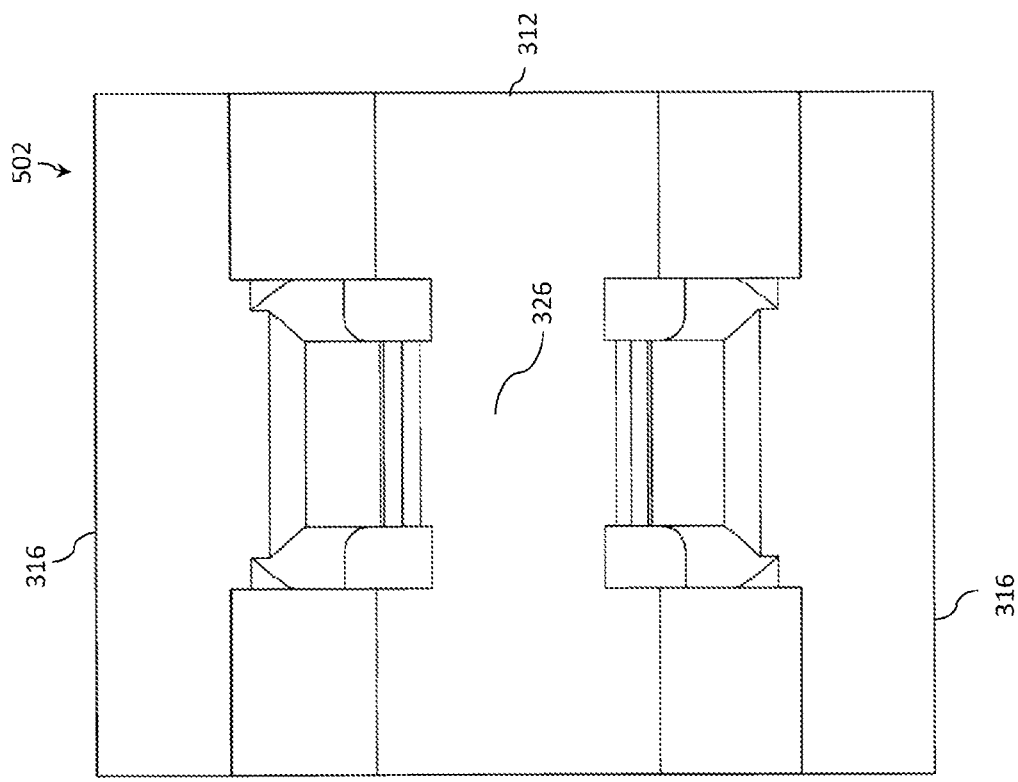
FIGS. 5g and 5h illustrate, respectively, topside and underside plan views of the fastener.
Figure 5G:
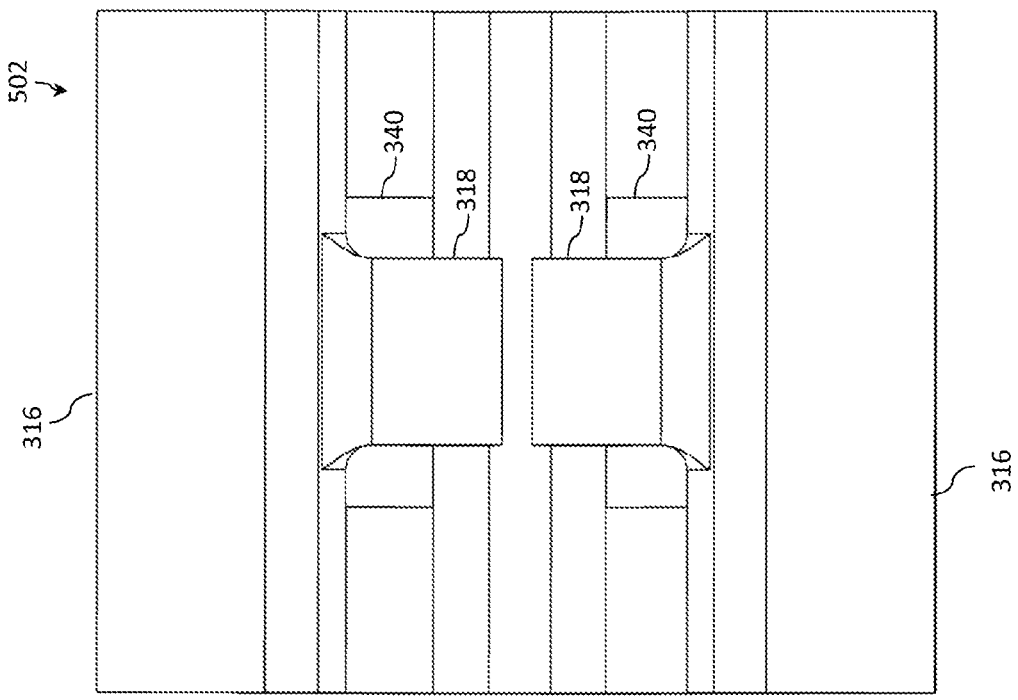

FIGS. 5a and 5b illustrate, respectively, topside and understate isometric views of a fastener 502 in accordance with another aspect of this disclosure. FIGS. 5c and 5d illustrate front and rear elevation views of the fastener 502. FIGS. 5e and 5f illustrate first and second side elevation views of the fastener 502. FIGS. 5g and 5h illustrate, respectively, topside and underside plan views of the fastener 502. In terms of general design and application, the fastener 502 of FIGS. 5a through 5h is substantially the same as the fastener 102 of FIGS. 3a through 3h, except that certain dimensions and shapes have been adjusted as illustrated therein. For example, as best illustrated in FIG. 5c, each of the arms 308 includes with a first linear portion 308a that arranged at angle β relative to a second linear portion 308b. The first linear portion 308a is parallel to plane 330, while the angle β may be, for example, between about 145 and 160 degrees, or about 153 degrees. In addition, a ledge 504 is located at the point of connection 310 to engage the opening 106 in the first component 104 post assembly. Finally, the fastener 502 includes mounting brackets 318 that are shorter that those of the fastener 102 of FIGS. 3*a* through 3*h*.

The fastener 102 offers certain advantages. For example, the ledge 504 and curvature of the rib(s) 304 (e.g., portion of circular arc (A) 408) allow for the fastener 102 to retain better in a first component 104 that is configured as a punched/painted panel condition. While some designs were intended meant for the B-surface 104*b* (extraction side) of the first component 104 to be sharp, thus needing a steeper angle to allow it to release during extraction. The described fastener 102, however, can be used with punched/painted panels that might not have such a sharp edge to retain the fastener 102. Therefore, the fastener 102 can compensate in instances where a sharp edge is not available via the curvature of the rib(s) 304 (e.g., portion of circular arc (A) 408) and the ledge 504 at the necessary or useful performance levels.

While the present method and/or system has been described with reference to certain implementations, it will be understood by those skilled in the art that various changes may be made and equivalents may be substituted without departing from the scope of the present method and/or system. Therefore, although examples for fasteners have been described in language specific to structural features and/or methods, it is to be understood that the appended claims are not limited to the specific features described. Rather, the specific features are disclosed as examples of fasteners. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed:

1. A fastener comprising:
a body portion, the body portion comprising a plurality of ribs arranged to form a U-bend,
wherein each of the plurality of ribs defines a curved rib profile designed to regulate at least one of an insertion force or a separation force of the fastener;
a bridge connecting the plurality of ribs to each other at the U-bend; and
a shank portion extending from the body portion, the shank portion comprising a plurality of arms,
wherein each of the plurality of arms is cantilevered at a free end of a rib from among the plurality of ribs and extends therefrom in a direction away from the body portion to be hingeable about the arm, and
wherein the curved rib profile is curved starting at the U-bend and ending at the shank portion.

2. The fastener of claim 1, wherein a radius of curvature of the curved rib profile is between 15 mm and 30 mm.

3. The fastener of claim 1, wherein the shank portion further includes a connecting element connecting free ends of the plurality of arms on either side of the U-bend to each other.

4. The fastener of claim 3, comprising a plurality of mounting brackets to mount a clip tower to the fastener, at least one mounting bracket being provided on either side of the U-bend supported at the connecting element.

5. The fastener of claim 1, comprising at least one grasping element on either side of the U-bend for gripping a component mounted onto the fastener, the at least one grasping element being coupled to the bridge and extending from the bridge along the body portion of the fastener.

6. The fastener of claim 5, wherein the at least one grasping element comprises a mating face shaped to taper in the direction from the U-bend along the body portion to align a clip tower towards a center of the U-bend when the clip tower is being mounted to the fastener.

7. The fastener of claim 1, wherein the fastener is designed for a separation force of at least 130 Newtons and for the insertion force of less than 45 Newtons.

8. The fastener of claim 1, wherein the fastener is fabricated using a synthetic polymer or a semi-synthetic polymer.

9. The fastener of claim 8, wherein the fastener is fabricated using an additive manufacturing technique.

10. The fastener of claim 1, wherein the fastener is configured to join a first component and a second component via a clip tower associated with the second component.

11. The fastener of claim 10, wherein the body portion is configured to receive the clip tower between the plurality of ribs of the U-bend.

12. The fastener of claim 10, wherein the first component is a metallic panel.

13. A fastener for joining a first component and a second component, the fastener, comprising:
a body portion, the body portion comprising a plurality of ribs arranged to form a U-bend;
a bridge connecting the plurality of ribs to each other at the U-bend;
a shank portion extending from the body portion, the shank portion comprising a plurality of arms,
wherein each of the plurality of ribs defines a rib profile that is curved starting at the U-bend and ending at the shank portion that is configured to regulate at least one of an insertion force or a separation force of the fastener,
wherein each of the plurality of arms is cantilevered at a free end of a rib from among the plurality of ribs and extends therefrom in a direction away from the body portion to be hingeable about the arm; and
a plurality of mounting brackets to mount a clip tower of the second component to the fastener.

14. The fastener of claim 13, wherein a radius of curvature of the rib profile is between 15 mm and 30 mm.

15. The fastener of claim 13, wherein the shank portion further includes a connecting element connecting free ends of the plurality of arms on either side of the U-bend to each other.

16. The fastener of claim 15, wherein at least one mounting bracket is provided on each side of the U-bend supported at the connecting element.

17. The fastener of claim 13, comprising at least one grasping element on either side of the U-bend for gripping a component mounted onto the fastener, the at least one grasping element being coupled to the bridge and extending from the bridge along the body portion of the fastener.

18. The fastener of claim 17, wherein the at least one grasping element comprises a mating face shaped to taper in the direction from the U-bend along the body portion to align a clip tower towards a center of the U-bend when the clip tower is being mounted to the fastener.

19. A fastening system comprising:
a first component having an opening;

a second component having a clip tower; and a fastener configured for insertion into the opening, wherein the fastener includes a body portion, a bridge, and a shank portion extending from the body portion, wherein the body portion includes a plurality of ribs arranged to form a U-bend to receive the clip tower, each of the plurality of ribs defining a curved rib profile starting at the U-bend and ending at the shank portion and configured to regulate at least one of an insertion force or a separation force of the fastener, wherein the bridge is configured to connect the plurality of ribs to each other at the U-bend, wherein the shank portion comprising a plurality of arms, and wherein each of the plurality of arms is cantilevered at a free end of a rib from among the plurality of ribs and extends therefrom in a direction away from the body portion to be hingeable about the arm.

\* \* \* \* \*